United States Patent [19]

Graiver et al.

[11] Patent Number: 5,789,612

[45] Date of Patent: Aug. 4, 1998

[54] NEUTRALIZATION METHOD FOR POLYORGANOSILOXANES

[75] Inventors: Daniel Graiver; Arthur James Tselepis, both of Midland, Mich.

[73] Assignee: Dow Corning Corporation, Midland, Mich.

[21] Appl. No.: 939,674

[22] Filed: Sep. 29, 1997

[51] Int. Cl.$^6$ .................................................. C07F 7/08
[52] U.S. Cl. .................................. 556/451; 556/450
[58] Field of Search ................................ 556/450, 451

[56] References Cited

U.S. PATENT DOCUMENTS

| | | | |
|---|---|---|---|
| 4,816,541 | 3/1989 | Koerner et al. | 556/451 X |
| 5,239,101 | 8/1993 | Bokerman et al. | 556/451 |
| 5,241,032 | 8/1993 | Kobayashi et al. | 528/12 |
| 5,493,041 | 2/1996 | Biggs et al. | 556/451 |
| 5,514,828 | 5/1996 | Evans | 556/462 |
| 5,616,756 | 4/1997 | Nakashima | 556/451 |

*Primary Examiner*—Paul F. Shaver
*Attorney, Agent, or Firm*—William F. Boley

[57] ABSTRACT

A method for neutralizing a polyorganosiloxane mixture. The method comprises (A) contacting a mixture comprising a polyorganosiloxane and an acid with a neutralizing amount of a solid organic base at a mixture temperature above the melting temperature of the solid organic base forming a molten organic base and forming an insoluble adduct of the acid with the molten organic base, (B) lowering the mixture temperature to effect solidification of residual molten organic base to residual solid organic base, and (C) effecting separation of the insoluble adduct and the residual solid organic base from the polyorganosiloxane mixture. The present invention is especially useful for neutralizing mixtures comprising polyorganosiloxane mixtures where the polyorganosiloxane comprises hydrogen atoms bonded to silicon.

18 Claims, No Drawings

NEUTRALIZATION METHOD FOR POLYORGANOSILOXANES

BACKGROUND OF INVENTION

The present invention is a method for neutralizing a polyorganosiloxane mixture having contained therein an acid. The method comprises contacting the mixture with a neutralizing amount of a solid organic base at a mixture temperature above the melting point temperature of the solid organic base to form an insoluble adduct of the acid with the molten organic base, lowering the mixture temperature to effect solidification of residual molten organic base to residual solid organic base, and effecting separation of the insoluble adduct and the residual solid organic base from the polyorganosiloxane mixture by standard means for separating solid-liquid mixtures.

Polyorganosiloxanes are used in the form of fluids and are crosslinked to form, for example, silicone rubbers and resins. It is important that polyorganosiloxane fluids as well as compositions containing such fluids and components prepared therefrom be stable during storage, shipment, and exposure to heat. A typically process for making polyorganosiloxanes involves heating low molecular weight linear polyorganosiloxanes and cyclic polyorganosiloxanes at a temperature above about 40° C. in the presence of a strong acid such as trifluoromethanesulfonic acid to effect polymerization of the siloxanes to higher molecular weight polyorganosiloxanes. The product of this acid catalyzed reaction is an equilibrium mixture comprising as a major portion linear polyorganosiloxanes and as a minor portion cyclic polyorganosiloxanes. The presence of the cyclic polyorganosiloxanes in products is undesirable because they can have sufficiently high vapor pressure to cause problems during use, and therefore these cyclics are typically removed by heat distillation under reduced pressure. If the acid catalyst is not neutralized additional cyclic siloxanes will be generated during the distillation process in an attempt to maintain equilibrium conditions. In addition polyorganosiloxanes and compositions comprising them have impaired heat resistance and storage stability when the acid catalyst is not sufficiently neutralized.

Evans, U.S. Pat. No. 5,514,828, teaches that in a process for making polyfluoroalkylsiloxane fluid using a strong acid such as trifluoromethane sulfonic acid as catalyst that the catalyst can be neutralized by adding a solid basic material such as alkaline earth carbonates and oxides such as magnesium carbonate, magnesium oxide, and barium carbonate; alkali metal bicarbonates such as sodium bicarbonate and ammonium bicarbonate. Evans teaches the excess neutralizing agent and the formed salts can be filtered off and product polyfluoroalkylsiloxane fluid recovered. However, a problem associated with the neutralizing method described by Evans is that since the carbonates and oxides are insoluble and do not melt it is run as a heterogeneous process having liquid and solid phases which requires large excesses of the neutralizing agent and long neutralization times.

Kobayashi et al., U.S. Pat. No. 5,241,032, describe a process for making polyorganosiloxanes in the presence of a strong acid catalyst and subsequently neutralizing the acid catalyst by the addition of ammonia gas. Although the method described by Kobayashi et al is run as a gas-liquid phase process and provides for rapid neutralization of the acid catalyst, it is not entirely satisfactory since a large excess of gas is required and neutralization or complete removal of residual ammonia is difficult and an undesirable odor of the polyorganosiloxanes can result from the presence of residual ammonia.

The present invention provides for a method for neutralizing acid present in polyorganosiloxane mixtures by using as neutralizing agent a solid organic base having a melting point such that the mixture can be contacted with the solid organic base at a temperature above the melting point of the solid organic base thereby effecting neutralization in a homogeneous process containing only liquid reactants. The temperature of the mixture is then lowered below the melting point temperature of the molten organic base thereby effecting solidification of the residual molten organic base. Residual solid organic base and the insoluble adduct formed as the neutralization product can then be easily separated from the mixture by standard method for separating solid-liquid mixtures. Because the present neutralization method is run as a homogeneous liquid-phase process neutralization of the acid can be effected quickly without the use of large stoichiometric excesses of the solid organic base. Separation of residual solid organic base and the insoluble adduct neutralization product from the polyorganosiloxane mixture is readily achieved by cooling the mixture below the melting point of the solid organic base to effect solidification and using standards methods such as filtration to effect separation of the resulting solid-liquid mixture.

SUMMARY OF INVENTION

The present invention is a method for neutralizing a polyorganosiloxane mixture. The method comprises (A) contacting a mixture comprising a polyorganosiloxane and an acid with a neutralizing amount of a solid organic base at a mixture temperature above the melting temperature of the solid organic base forming a molten organic base and forming an insoluble adduct of the acid with the molten organic base, (B) lowering the mixture temperature to effect solidification of residual molten organic base to residual solid organic base, and (C) effecting separation of the insoluble adduct and the residual solid organic base from the polyorganosiloxane mixture. The present invention is especially useful for neutralizing mixtures comprising polyorganosiloxane mixtures where the polyorganosiloxane comprises hydrogen atoms bonded to silicon.

DESCRIPTION OF INVENTION

The present invention is a method for neutralizing a polyorganosiloxane mixture. The method comprises (A) contacting a polyorganosiloxane mixture comprising a polyorganosiloxane and an acid with a neutralizing amount of a solid organic base at a mixture temperature above the melting point temperature of the solid organic base forming a molten organic base and forming an insoluble adduct of the acid with the molten organic base, (B) lowering the mixture temperature to effect solidification of residual molten organic base to residual solid organic base, and C) effecting separation of the insoluble adduct and the residual solid organic base from the polyorganosiloxane mixture.

The polyorganosiloxane component of the present mixture can be any of those known in the art. Generally, the polyorganosiloxane can comprise repeating units described by formula —($R^1_2$SiO)$_x$—, where each $R^1$ can be independently selected from the group comprising hydrogen atoms and hydrocarbyl radicals comprising less than about 12 carbon atoms. The hydrocarbyl radical can be, for example, an alkyl such as methyl, ethyl, propyl, tert-butyl; an aryl such as phenyl; an alkenyl such as vinyl, allyl, and hexenyl, a cycloalkyl such as cyclopentyl and cyclohexyl; a substituted alkyl such as 3,3,3-trifluoropropyl and chloromethyl;

and a substituted aryl such as chlorophenyl. The number of repeating units denoted by x is not limited and can be from about two to 100,000 or greater. The polyorganosiloxane can be a linear or branched polymer. The polydiorganosiloxane can be monodisperse or polydisperse. The polydiorganosiloxane can be a homopolymer or a block or random copolymer. The polyorganosiloxane may be end-terminated, for example, with siloxy groups described by formula $R^1_2R^2_1SiO—$, where $R^1$ is as previously described and $R^2$ is selected from the group consisting of $R^1$ and hydroxyl. The polydiorganosiloxane can be, for example, trimethylsiloxy end-terminated polydimethylsiloxane, vinyldimethylsiloxy end-terminated polydimethylsiloxane, vinyldimethylsiloxy end-terminated polydimethyl(vinylmethyl)siloxane copolymer, dimethylhydroxysiloxy end-terminated polydimethylsiloxane, dimethylhydrogensiloxy end-terminated polydimethylsiloxane, dimethylhydrogensiloxy end-terminated polydimethyl(methylhydrogen)siloxane copolymer, trimethylsiloxy or (3,3,3-trifluoropropyl) dimethylsiloxy end-terminated polydiorganosiloxane having about 50 percent of pendant organic groups attached to silicon being methyl and the remainder being 3,3,3-trifluoropropyl, and trimethylsiloxy end-terminated polydimethyl(methylphenyl)siloxane copolymer.

The present method is particularly useful for neutralizing mixtures where the polyorganosiloxane comprises one or more hydrogen atoms bonded to silicon. It is well known that even moderately strong bases can cleave the Si-H bond. Therefore, processes for preparing polyorganosiloxanes having hydrogen bonded to silicon atoms are typically prepared using an acid catalyst and the catalyst is then neutralized with a mild base. To prevent scission of the Si-H bond during storage and use of the polyorganohydrogensiloxane it is necessary to neutralize the acid catalyst in a manner such that residual base is not left in the polyorganohydrogensiloxane. The present method offers an effective and convenient method for accomplishing this neutralization.

In a preferred method, the polyorganosiloxane mixture results from the polymerization of cyclic or short-chain polyorganosiloxanes, and mixtures thereof, in the presence of an acid. Such a mixture can be made by polymerizing cyclic polyorganosiloxanes having on the average from three to six organosiloxy units per molecule in the presence of short-chain linear polyorganosiloxanes useful as chain extenders and as endblockers. A preferred polyorganosiloxane mixture for use in the present method results from the trifluoromethane sulfonic acid catalyzed polymerization of a mixture comprising linear polymethylhydrogensiloxanes, cyclic polydimethylsiloxanes, and a polydimethylsiloxane endblocker.

In the preferred polyorganosiloxane mixture for use in the present method the polyorganosiloxane is a trimethylsiloxy end-terminated polydimethyl(methylhydrogen)siloxane copolymer or dimethylhydrogensiloxy end-terminated polydimethyl(methylhydrogen)siloxane copolymer.

The acid comprising a portion of the polyorganosiloxane mixture is not critical to the present method as long as the acid can form an insoluble adduct with the solid organic base. In a preferred method the acid present in the polyorganosiloxane mixture is trifluoromethane sulfonic acid or the silyl esters of trifluoromethanesulfonic acid such as trimethylsilyl trifluoromethanesulfonate and triethylsilyl trifluoromethanesulfonate. Most preferred is when the acid is trifluoromethane sulfonic acid. The concentration of the acid in the polyorganosiloxane mixture is not critical and can generally be those concentrations useful in catalyzing the polymerization of polyorganosiloxane mixture, for example up to 1,000 ppm.

The solid organic base useful in the present method can be any material which has a melting point temperature lower than the temperature at which significant decomposition of the polyorganosiloxane occurs, forms an insoluble adduct with the acid to be neutralized through an acid-base reaction while in the molten state, and can be solidified by lowering the temperature of the neutralized mixture to allow separation from the mixture by methods for separating solid-liquid mixtures. It is preferred that the solid organic base have a melting point temperature above about 20° C. Even more preferred is when the solid organic base has a melting point temperature within a range of about 20° C. to 100° C. Most preferred is when the solid organic base has a melting point temperature within a range of about 40° C. to 90° C.

The chemical nature of the insoluble adduct of the solid organic base with the acid is not critical as long as the insoluble adduct is sufficiently insoluble under the condition of the method to allow separation from the polyorganosiloxane mixture as a solid. The insoluble adduct may be, for example, a compound, salt, or complex resulting from the contact of the acid with the solid organic base in the molten state.

By the term "neutralizing amount" of a solid organic base, it is meant any amount capable of neutralizing all or a portion of the acid present in the polyorganosiloxane mixture through an acid-base reaction thereby forming an insoluble adduct with the acid. Since in the present method the polyorganosiloxane mixture has a temperature above the melting point of the solid organic base, the method is run as a homogeneous liquid phase process thereby effecting very efficient contact of the organic base with the acid and therefore large excesses of the solid organic base are not required. To ensure optimal neutralization of the acid it is preferred that the solid organic base be added to the present method in at least stoichiometric equivalence relative to the acid. Preferred is when about 1 to 2 stoichiometric equivalents of solid organic base is added relative to the acid. Most preferred is when the solid organic base is added to the present method at about 1.1 stoichiometric equivalents relative to the acid.

The solid organic base can be, for example, selected from the group consisting of ethyl carbamate, urea, 1,1-diethyl urea, 1,3-diethyl urea, ε-caprolactam, diacetamide, acetamide, acrylamide, imidazole, maleimide, acetaldehyde ammonia trimer, and succinimide. A preferred solid organic base for use in the present method is selected from the group consisting of ε-caprolactam, acetamide, urethane, and imidazole. The most preferred solid organic base is ε-caprolactam.

The method of effecting the contact of the polyorganosiloxane mixture with the solid organic base is not critical to the present invention as long as the temperature of the polyorganosiloxane mixture is above the melting point of the solid organic base thereby forming a molten organic base. The solid organic base can be added to the polyorganosiloxane mixture and the mixture heated to a temperature above the melting point of the solid organic base or the temperature of the polyorganosiloxane mixture may already be above the melting temperature of the solid organic base when added. In a preferred method, the solid organic base is added to a polyorganosiloxane mixture resulting from the acid catalyzed polymerization of cyclic and/or linear polyorganosiloxanes at an elevated temperature before cooldown has occurred of the mixture below the melting point temperature of the solid organic base. To insure efficient contact of the solid organic base in the molten state with the acid it is preferred that sufficient mixing of the polyorganosiloxane mixture with the organic base be effected to form an essentially homogeneous mixture. The mixing can be achieve by standard methods such as stirring.

The length of time of contact of the solid organic base in the molten state with the polyorganosiloxane mixture is not critical as long as adequate contact is provided to provide the required level of neutralization. Generally, a contact time within a range of about 1 second to 4 hours is considered useful. More preferred is a contact time within a range of about 5 minutes to 4 hours. Even more preferred is a contact time within a range of about 30 minutes to 3 hours. Longer contact times may be used, but in some instances the insoluble complex of the acid with the solid organic base may hydrate causing the complex to solubilize in the polyorganosiloxane mixture and thereby reduce the neutralization effectiveness of the method.

After the solid organic base in the molten state has been contacted with the acid for the desired amount of time, the mixture temperature is lowered to effect solidification of residual molten organic base to residual solid organic base. The method of lowering the temperature is not critical and can be by allowing the mixture to cool to ambient temperature unassisted by external means or by providing external cooling to the wall of the container containing the mixture. It is only necessary that the mixture be cooled sufficient to effect solidification of the molten organic base, however cooling to lower temperatures is acceptable if desired.

Separation of the insoluble adduct and the residual solid organic base from the polyorganosiloxane mixture can be effected by standard methods for separation of solid-liquid mixtures. Separation can be effect by such standard methods as settling, centrifugation, and filtration. Filtration is a preferred method for separating the insoluble adduct and the solid organic base from the polyorganosiloxane mixture.

The following examples are provided to illustrate the present invention. These examples are not intended to limit the scope of the claims herein.

EXAMPLE 1

The ability of ε-caprolactam to neutralize a polymethylhydrogensiloxane fluid was evaluated. The polymethylhydrogensiloxane fluid was prepared by adding to a 2 L flask, equipped with a stirrer and temperature controller 7.8 g of a trimethylsiloxy end-blocked polymethylhydrogensiloxane having a degree of polymerization of about 30 to 40, 11 g of a 2 mPa·s polydimethylsiloxane fluid, 893 g of cyclic polydimethylsiloxanes, and $5 \times 10^{-3}$ moles of trifluoromethanesulfonic acid. This mixture was heated to 45° C. and allowed to polymerize for 10 hours.

Aliquots of the above prepared polymethylhydrogensiloxane were neutralized with 1.1 equivalents of ε-caprolactam (m.p. 70°–72° C.) at the temperatures described in Table 1. The Acid Number of each of the aliquots was determined at the times described in Table 1. The Acid Number was determined by titration with potassium hydroxide using phenolphthalein as indicator and the results are reported in Table 1 as milligrams of potassium hydroxide per gram of the polymethylhydrogensiloxane. The Acid Number of the unneutralized polymethylhydrogensiloxane was 0.119.

TABLE 1

Neutralizing Effects of ε-Caprolactam

| | Acid Number | |
|---|---|---|
| Time (hrs) | 45° C. | 75° C. |
| 0.5 | 0.076 | 0.024 |
| 1 | 0.078 | 0.024 |
| 2 | 0.079 | 0.016 |
| 3 | 0.079 | 0.017 |
| 4 | 0.051 | 0.014 |

EXAMPLE 2

The ability of acetamide, urethane, and imidazole to neutralize a polymethylhydrogensiloxane polymer was evaluated. The polymethylhydrogensiloxane was prepared as described in Example 1 and had an Acid Number of 0.119. The polymer was divided into aliquots with 1.1 equivalents of acetamide, urethane, or imidazole being added to duplicate aliquots. One duplicate aliquot containing each of the neutralizing agents was heated to 100° C. for three minutes to melt the neutralizing agent and the other aliquot kept at room temperature. To each of these aliquots was added 0.1 g of perlite as filtering aid (DICALITE®, Grefro, inc., Torrance, Calif.). Each aliquot was filter at room temperature and the Acid Number determined by titration with methanolic potassium hydroxide using bromocresol purple as an indicator. The Acid Number for each of the tested samples is provided in Table 2.

TABLE 2

Ability of Selected Solid Organic Bases to Neutralize Polymethylhydrogensiloxanes

| | | Acid Number ($\times 10^{-3}$) | |
|---|---|---|---|
| Compound | Melting Temp. (°C.) | Rm. Temp. | 100° C. |
| Acetamide | 79–81 | 8.98 | 3.97 |
| Urethane | 48.5–50 | 10.07 | 4.44 |
| Imidazole | 88–90 | 6.59 | 2.52 |

EXAMPLE 3 (COMPARATIVE EXAMPLE)

The ability of $(NH_4)_2CO_3$ to neutralize a polymethylhydrogensiloxane was evaluated. The polymethylhydrogensiloxane was prepared as described in Example 1 and had an acid number of 0.305. About 1.1 equivalents of the $(NH_4)_2CO_3$ were added to an aliquot of the polymethylhydrogensiloxane and the resulting mixture heated to 95° C. for 0.5 hour. The resulting mixture had a strong ammonia odor. The mixture was filtered using 0.1 g of perlite (DICALITE, Grefro, inc.) as filtering aid and still smelled of ammonia. The filtered material was placed under vacuum at 65° C. for 2 hours and the resulting product had no ammonia smell. The Acid Number of the mixture after heating under vacuum was 0.0229.

EXAMPLE 4 (COMPARATIVE EXAMPLE)

The ability of $CaCO_3$ to neutralize a polymethylhydrogen siloxane was evaluated. The polymethylhydrogensiloxane was prepared as described in Example 1 and had an acid number of 0.305. Ten equivalents of $CaCO_3$ were added to an aliquot of the polymethylhydrogensiloxane at room temperature. The mixture was then filtered. Filtering was difficult due to clogging of the filter. The Acid Number of the filtered product was 0.038.

We claim:

1. A method for neutralizing a polyorganosiloxane mixture comprising
    (A) contacting a polyorganosiloxane mixture comprising a polyorganosiloxane and an acid with a neutralizing amount of a solid organic base at a mixture temperature above the melting point temperature of the solid organic base forming a molten organic base and forming an insoluble adduct of the acid with the molten organic base,
    (B) lowering the mixture temperature to effect solidification of residual molten organic base to residual solid organic base,
    (C) effecting separation of the insoluble adduct and the residual solid organic base from the polyorganosiloxane mixture.

2. A method for forming a neutralized polyorganosiloxane mixture comprising
    (A) contacting an organosiloxane oligomer with an acid effective as a catalyst at a contact temperature greater than about 20° C. to effect formation of a polyorganosiloxane mixture comprising polyorganosiloxane and the acid,
    (B) contacting the polyorganosiloxane mixture with a neutralizing amount of a solid organic base having a melting point temperature less then the contact temperature of step (A) and forming an insoluble adduct with the acid, where the temperature of the polyorganosiloxane mixture is greater than the melting point temperature of the solid organic base thereby forming a molten organic base,
    (C) lowering the temperature of the polyorganosiloxane mixture to effect solidification of residual molten organic base to residual solid organic base, and
    (D) effecting separation of the insoluble adduct and residual solid organic base from the polyorganosiloxane mixture.

3. A method according to claim 2, where the polyorganosiloxane comprises polydimethylsiloxy and polymethylhydrogensiloxy units.

4. A method according to claim 2, where the solid organic base is an amine.

5. A method according to claim 2, where the solid organic base is selected from a group consisting of ethyl carbamate, urea, 1,1-diethyl urea, 1,3-diethyl urea, ε-caprolactam, diacetamide, acetamide, acrylamide, imidazole, maleimide, acetaldehyde ammonia timer, and succinimide.

6. A method according to claim 2, where the acid is trifluoromethane sulfonic acid or a silyl ester of trifluoromethane sulfonic acid.

7. A method according to claim 2, where the melting point temperature of the solid organic base is within a range of about 20° C. to 100° C.

8. A method according to claim 2, where the melting point temperature of the solid organic base is within a range of about 40° C. to 90° C.

9. A method according to claim 2, where the neutralizing amount of the solid organic base is about 1 to 2 stoichiometric equivalents relative to the acid.

10. A method according to claim 2, where the neutralizing amount of the solid organic base is about 1.1 stoichiometric equivalents relative to the acid.

11. A method according to claim 2, where the mixture is contacted with the molten organic base for a period of time within a range of about 1 second to 4 hours.

12. A method according to claim 2, where the mixture is contacted with the molten organic base for a period of time within a range of about 5 minutes to 4 hours.

13. A method according to claim 2, where the mixture is contacted with the molten organic base for a period of time within a range of about 30 minutes to 3 hours.

14. A method according to claim 1, where the polyorganosiloxane comprises polydimethylsiloxy and polymethylhydrogensiloxy units.

15. A method according to claim 1, where the solid organic base is an amine.

16. A method according to claim 1, where the solid organic base is selected from a group consisting of ethyl carbamate, urea, 1,1-diethyl urea, 1,3-diethyl urea, ε-caprolactam, diacetamide, acetamide, acrylamide, imidazole, maleimide, acetaldehyde ammonia timer, and succinimide.

17. A method according to claim 1, where the melting point temperature of the solid organic base is within a range of about 40° C. to 90° C.

18. A method according to claim 1, where the neutralizing amount of the solid organic base is about 1 to 2 stoichiometric equivalents relative to the acid.

* * * * *